Oct. 27, 1925.

J. S. REILLY 1,558,922

ICE CREAM SUNDAE CONE

Filed Jan. 26, 1925

Inventor
John S. Reilly
By his Attorneys,
Ward Crosby and Smith

Patented Oct. 27, 1925.

1,558,922

UNITED STATES PATENT OFFICE.

JOHN S. REILLY, OF NEW YORK, N. Y.

ICE-CREAM-SUNDAE CONE.

Application filed January 26, 1925. Serial No. 4,637.

*To all whom it may concern:*

Be it known that I, JOHN S. REILLY, a citizen of the United States, and resident of city, county, and State of New York, have invented certain new and useful Improvements in Ice-Cream-Sundae Cones, of which the following is a specification.

My invention relates to ice cream sundae cones, that is to say, to improvements in edible cones for containing ice cream or ice cream sundaes, or other food materials having some tendency to flow. Ice cream cones as usually served contain a generous measure of ice cream so that the latter is usually heaped up to a certain extent above the top of the cone. If it is attempted to serve ice cream sundaes, that is, ice cream having a thick syrup poured on top, in the same way, the syrup is very likely to run down the outer surface of the cone. An unsightly appearance is thereby presented, the cone becomes sticky to the touch and more or less of the syrup may be lost.

An object of the present invention is the provision of an edible cone or similar container for ice cream, in which the difficulties referred to will be obviated. In accordance with the invention the upper edge of the cone or container is provided with a recess or pocket or series of pockets extending downwardly somewhat from the upper edge. Preferably a plurality of pockets are thus provided extending around the upper edge of the cone, these pockets being separated by low partitions formed of the material of the cone. With such a construction drippage from the ice cream or the syrup on the top of the heaped up ice cream in the cone will drop into the peripheral pockets. The syrup in the pockets will, in some cases, seep or run downwardly through the cone material to some extent and may to greater or less extent, find its way through the inner wall of the cone and spread over the inner surface of the cone. The purchaser of the cone eats the container as well as the material contained therein and the cone itself containing the syrup drippings, either contained in the body of the cone or spread over the inner surface thereof, will become a more enjoyable part of the confection than would the plain cone without syrup. It may also be noted that the cone may be used for holding ice cream alone with considerable advantage over the cones previously known, because of the fact that a larger portion of ice cream may be heaped into the same, than in the case of a cone of present construction having the same inside diameter at the upper end, it being also noted that any drippings from the ice cream itself will run into the peripheral pockets formed in the cone. The cone may be coated with icing, if desired, or it may be otherwise treated to render its outer surface (or its inner surface) less porous, to thus more surely prevent the drippings escaping to the outer surface of the cone.

Other objects of the invention comprise the provision of improved forms of construction as will be more fully set forth in the following specification and as will be particularly pointed out in the appended claims.

In order that the invention may be more clearly understood, attention is hereby directed to the accompanying drawings forming part of this application and illustrating one embodiment of the invention, which is at present preferred. In the drawings Fig. 1 represents a vertical section through an ice cream sundae cone embodying my invention, this section being taken on line 1—1 of Fig. 2;

Figure 1:
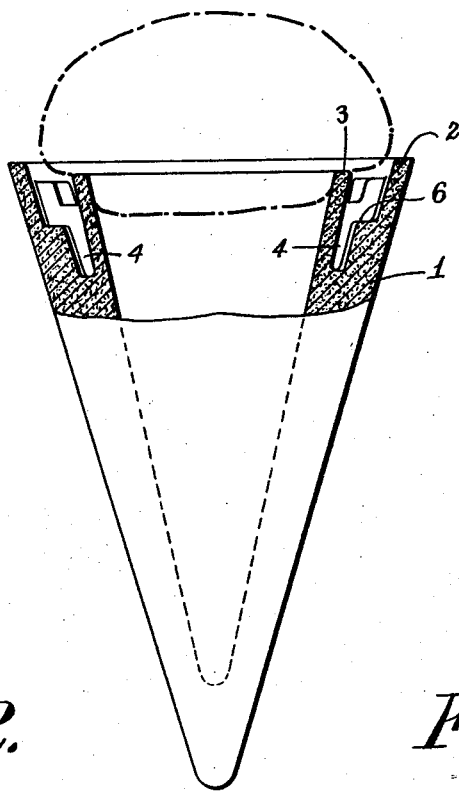
Figure 2:
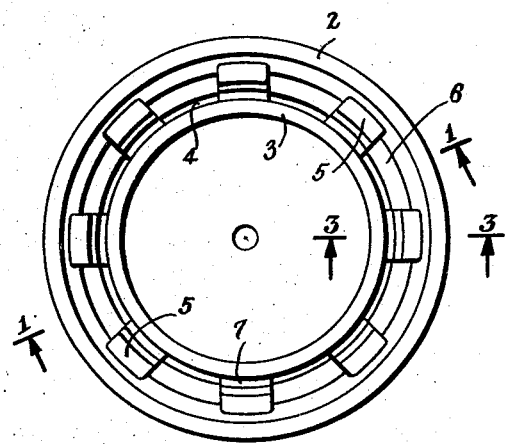
Fig. 2 is a top plane view of the cone.

Referring to the drawings the cone 1 is formed of edible material, such for example, as is commonly used for ice cream cones. The cone is preferably thicker at the top than at the bottom, that is to say, in the preferred form of construction the walls of the cone decrease in thickness from top to bottom, and the thickness at the top, in the preferred form of the construction is sufficient to accommodate the peripheral pockets referred to. The cone, therefore, in its preferred form has walls which are somewhat thicker than those of the cones commonly used.

In the form of construction illustrated, the cone is provided at its upper end with an outside peripheral edge portion 2 and an inside peripheral edge portion 3, the inside edge portion 3 being somewhat lower than the outside edge portion. The cone is provided with a series of pockets, 4, which extend down into the material of which the cone is formed between the outer and inner edge portions 2 and 3. These pockets, 4, are separated by lugs or partitions 5. Preferably the pockets 4 are wider, in radial direction, at the top than towards the bottom of the same. The upper portion of the pockets may, for example, be of one width and the lower portion of the pockets of lesser width, with a horizontal ledge or shelf, 6, extending inwardly for a slight distance at the bottom of the upper portion of greater width. With this construction, the drippings in the pockets will be diverted towards the inner wall of the cone, so that any of the same escaping from the bottoms of the pockets will be more likely to find their way to the inside surface of the cone, and less likely to come out on the outside surface. Also, the construction described strengthens the cone at a point where strength is needed, near the bottom of the pockets.

Figure 3:
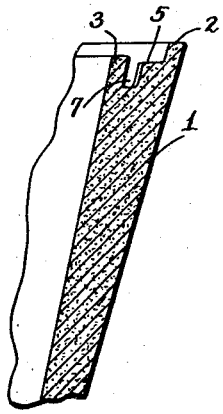
Fig. 3 is a partial vertical section taken on line 3—3 of Fig. 2.

The lugs or partitions 5 are preferably spaced somewhat down from the top of the upper edge portion 2 of the cone, as shown in Fig. 3. Preferably each of these lugs is provided with a somewhat shallow peripherally extending groove 7 at its inner edge.

The cone as described may be suitably moulded or otherwise formed as an integral construction. Ice cream placed in the cone will be heaped up above the same with the heaped up upper portion thereof resting on the inner edge portion 3 of the cone and the outer edge portion of the top of the pile over-hanging the peripheral pockets. It is possible to pile a larger amount of ice cream upon the cone than would be possible if the inner edge portion of the cone constituted the entire thickness of the upper end of the cone. When syrup of the kind commonly used for ice cream sundaes is placed on the top of the heaped up ice cream some of it will drip off the edges of the ice cream into the pockets. If too much syrup drips into one particular pocket it will flow through the channels 7 of the adjacent lugs 5 into the adjoining pockets. If some of the syrup escapes through the bottoms and sides of the pockets, it will either be contained within the body of the cone material, or, which may be preferable, will escape to the inner surface of the cone, in which the ice cream is contained. This latter effect may be increased by the provision of channels leading from the pockets to the inner surface of the cone, if desired.

The user of the cone, having first eaten the heaped up ice cream and syrup, next begins to eat the upper edge of the cone itself together with the syrup contained in the pockets. It will be noted that the separation of the pockets one from the other by the partitions 5 will prevent the syrup in the other pockets from flowing to the point at which the eater of the cone has eaten away the outer edge, so that there is only a limited quantity of syrup to be eaten at this point, and less likelihood, accordingly, of the syrup running out on to the outer surface of the cone, when the outer edge portion has been eaten away by the user.

It will be understood that the invention is not strictly limited to the exact details of construction which have been particularly described, but that all reasonable equivalents of the same are included within the invention, the scope of which is indicated by the appended claims.

I claim—

1. An edible container adapted for holding ice cream sundaes having peripheral pockets formed in its top surface, separated by radial portions, each of said radial portions having a shallow peripherally extending groove across its upper surface, to permit flow of excess material from one pocket to the next.

2. An edible container adapted for holding ice cream sundaes having peripheral pockets formed in its top surface, separated by radial portions, said pockets having inner and outer walls, said outer wall being of one thickness adjacent to the top of the pocket and of a greater thickness adjacent to the bottom of the pocket.

3. An edible container adapted for holding ice cream sundaes, having a peripheral wall, the upper portion of which is recessed to provide separated upstanding inner and outer portions, the upper edge of the inner portion being lower than the upper edge of the outer portion, and being adapted to form a seat for the ice cream, so that drippings from the ice cream or syrup thereon will fall in the space between said inner and outer portions.

4. An edible container adapted for holding ice cream sundaes, having peripheral pockets formed in its top surface, separated by radial portions, said pockets having inner and outer walls, said radial portions joining together said outer and inner walls, the top surfaces of said radial portions being lower than the upper edges of said walls.

In testimony whereof I have signed my name to this specification.

JOHN S. REILLY.